United States Patent [19]

Fiedler et al.

[11] Patent Number: 5,451,736
[45] Date of Patent: Sep. 19, 1995

[54] WELDING PROCESS FOR CONNECTING A WINDING WIRE OF A COIL TO A TERMINAL AND METAL SLEEVE FOR USE IN THIS PROCESS

[75] Inventors: Arthur Fiedler, Wollbach; Hans-Jürgen Söllner, Berlin; Erich Vojta, Hemhofen, all of Germany

[73] Assignee: Siemens Aktiengesellschaft, Munich, Germany

[21] Appl. No.: 162,045

[22] PCT Filed: Jun. 1, 1992

[86] PCT No.: PCT/DE92/00443
§ 371 Date: Dec. 3, 1993
§ 102(e) Date: Dec. 3, 1993

[87] PCT Pub. No.: WO92/22103
PCT Pub. Date: Dec. 10, 1992

[30] Foreign Application Priority Data

Jun. 3, 1991 [DE] Germany .......... 41 18 166.2

[51] Int. Cl.⁶ .................................. B23K 9/167
[52] U.S. Cl. .................... 219/56.22; 219/121.64
[58] Field of Search ............... 219/56.1, 56.22, 56.21, 219/129, 121.63, 121.64, 127

[56] References Cited

U.S. PATENT DOCUMENTS

| | | | |
|---|---|---|---|
| 3,539,762 | 11/1970 | Swengel, Sr. et al. | 219/127 |
| 3,610,874 | 10/1971 | Gagliano | 219/121.63 |
| 3,703,623 | 11/1972 | Swengel, Sr. | 219/137 R |
| 3,795,786 | 3/1974 | Chanowitz | 219/137 R |
| 4,039,801 | 8/1977 | Foerster et al. | 219/137 R |
| 4,530,563 | 7/1985 | Brzezinski | . |
| 4,966,565 | 10/1990 | Dohi | 439/874 |

FOREIGN PATENT DOCUMENTS

| | | |
|---|---|---|
| 915104 | 7/1954 | Germany . |
| 3441440 | 5/1985 | Germany . |
| 3911027 | 10/1990 | Germany . |

*Primary Examiner*—Clifford C. Shaw
*Attorney, Agent, or Firm*—Hill, Steadman & Simpson

[57] ABSTRACT

A method for connecting a wire, such as a wire from a coil, to a terminal, includes placing a metal cap with an at least partially closed end over the terminal on which the wire has been wound. The partially closed end rests on the free end of the terminal post. The metal cap is melted onto the wire and the terminal by welding its at least partially closed end in an inert gas. The metal cap may be crimped onto the terminal before welding. The metal cap is preferably of sheet metal that is formed into the cap shape be bending, and may include a conically shaped edge on it open end.

11 Claims, 2 Drawing Sheets

WELDING PROCESS FOR CONNECTING A WINDING WIRE OF A COIL TO A TERMINAL AND METAL SLEEVE FOR USE IN THIS PROCESS

BACKGROUND OF THE INVENTION

1. Field of the Invention

The invention relates to a welding process for connecting a preferably insulated winding wire of a coil to a terminal, including a metal sleeve being slipped over the terminal and the winding wire attached to the latter, and the metal sleeve, the terminal and the winding wire then being welded to one another under inert gas. The invention relates, furthermore, to a metal sleeve for use in this process.

2. Description of the Related Art

A preferred field of use of the present invention is coils for electromagnetic relays or similar switchgear. The windings of these coils consist, as a rule, of lacquer-insulated copper wires, a heat resistant lacquer insulation for the winding wires being necessary for use under relatively high thermal load. For contacting the winding ends with corresponding terminals, it has hitherto largely been customary to solder the stripped winding wire to the terminals. In addition to a complicated process technology in terms of the soldering baths and handling, the disadvantage of this soldering process is that the fluxes used for such process, in so far as they cannot be removed completely, can subsequently generate contact-impairing vapors in the switchgear.

Moreover, it is also already known to contact winding wires and terminals by means of a welded joint. In conventional welding processes, however, there is the risk that the copper alloys of the winding wires or of the terminals will become brittle and therefore be in danger of breaking. German Patent Application 39 11 027 has consequently already proposed a process of the type mentioned in the introduction, in which an arc-welding process is carried out under inert gas, a metal sleeve being welded over the terminal and the wound-on wire. This relates, however, to a sleeve which is open at both ends and which is slipped over the terminal as far as the anchor location of the terminal in the base body and is then also pressed onto the base body. There is a risk, here, that the wound-on winding wire will be pulled in an undesirable way and possibly be pinched between the metal sleeve and base body, thus resulting in the risk of subsequent breakage, for example in the event of temperature changes.

SUMMARY OF THE INVENTION

An object of the invention is, therefore, to improve the inert gas welding process mentioned in the introduction, with the use of a metal sleeve, in such a way that the sleeve is to be handled and positioned on the terminal as simply as possible, without the winding wire being subjected to mechanical stress in the region between the base body and terminal.

This is achieved, according to the invention, in that use is made of a metal sleeve in the form of a cap having an at least partially closed end, which sleeve is placed onto the free end of the terminal, and in that the cap is melted on from its closed end.

As a result of the use of a metal sleeve in the form of a cap or of a thimble, this metal sleeve, after being placed onto the free end of the terminal, remains seated on the end portion of this terminal, without additional measures, so that the winding wire disposed in the angular region between the base body and terminal is not additionally tensioned by the end edge of the cap. Since the cap, in order to be placed on more easily, must have a larger diameter than the terminal together with the wound-on winding wire end, it can be advantageous, before the welding step, to pinch this cap at its side regions against the terminal by means of a pincer-like device. This pincer-like device can at the same time form an electrical connection if the TIG-welding or plasma-arc welding process is used.

Instead of the arc-welding processes, other fusion-welding processes, such as laser-beam welding, can be employed. However, at all events, as already presupposed in the introduction, inert gas is blown, preferably in the axial direction, onto the closed cap end to be welded, in order to prevent embrittlement and scaling of the welded joint.

The metal cap employed for use in the process according to the invention can be designed, for example, as a deep-drawn part. Production and handling are especially simple if the cap consists of a sheet-metal blank having a middle part of reduced width and two elongated side parts, the middle part forming the partially closed end of the cap and the two bent-up side parts forming a sleeve casing. Special steel or copper-plated steel comes into consideration by way of example as material for the cap. In a preferred embodiment, the cap consists of an alloy based on copper with a so-called silphos plating. This is a conventional hard-solder layer which contains copper, silver and phosphorous.

BRIEF DESCRIPTION OF THE DRAWINGS

The invention is explained in more detail below by means of exemplary embodiments with reference to the drawing. In this:

FIGS. 6a and 6b are a plan view of a sheet-metal blank, somewhat modified in relation to FIG. 5, and, respectively, a metal cap formed from the blank of FIG. 6a.

DETAILED DESCRIPTION OF THE PREFERRED EMBODIMENTS

Figure 1:
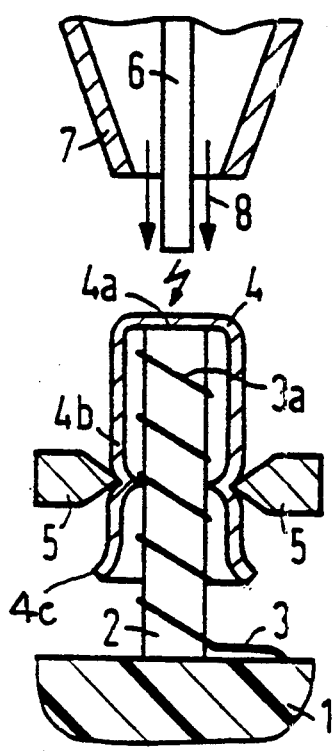
FIG. 1 is an enlarged cross section of an arrangement according to the invention for the welding of a winding onto a terminal pin, using an arc-welding process, for example TIG-welding.

FIG. 1 shows a fragmentary portion of a coil form 1, for example from a relay or the like having a terminal pin 2 which is anchored therein and onto which is wound a winding wire 3 end 3a of a winding, not shown further, of the coil located on the coil form 1. The winding wire 3 consists, for example, of copper or of a copper alloy and is provided with a lacquer insulation. For the electrical and mechanical connection between the terminal pin 2 and the winding end 3a, the end 3a of the wire 3 is wound about the terminal 2 and a metal cap 4 is slipped over the free end of the terminal pin 2 and is seated with its closed end 4a on the terminal pin 2, so that it is placed exactly in the axial direction of the pin 2. In the present example, the cap is pinched in the region of its side walls 4b against the terminal pin 2 or the wound-on winding end 3a by means of pincer jaws 5 shown diagrammatically, so that it is also positioned in the radial direction.

In order to weld the terminal pin 2 to the winding end 3a and the cap 4, there is provided an arc-welding arrangement, in which, if appropriate, the pincer jaws 5 serve as a first electrode, while a second electrode 6 is arranged above the terminal pin 2 approximately in the axial direction of the latter. The electrode 6 is part of a TIG-welding torch, provided with an inert-gas nozzle 7, from which an inert gas stream 8 is blown onto the welding region during the welding operation.

Figure 2:
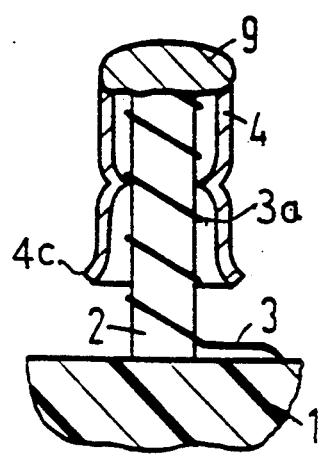
FIG. 2 is an enlarged cross section of a coil terminal pin with a welded-on winding end after a welding process according to the invention has been carried out.

In this welding operation, the closed end 4a of the cap 4 is fused together with the end of the terminal pin 2 and with part of the winding end 3a, to form a welding bead 9 which, after solidifying, assumes the shape shown diagrammatically in FIG. 2. The winding end 3a has thus been connected electrically and mechanically to the terminal pin 2, without embrittlement of the material occurring.

Figure 3:
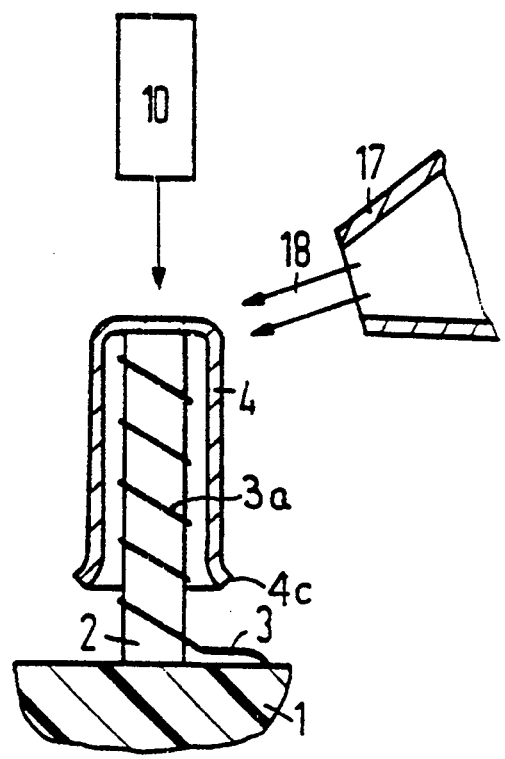
FIG. 3 is an enlarged cross-section of an arrangement, modified in relation to FIG. 1, for the use of a laser-welding process.

An arrangement, corresponding to that of FIG. 1, for the use of a laser-welding process is shown in FIG. 3. In this case, a lateral nozzle 17 serves simply for supplying the inert-gas steam 8, while the supply of heat takes place from above by means of a laser 10. The arrangement is otherwise identical or similar to that of FIG. 1. In principle, the positions of the laser 10 and of the nozzle 17 could also be interchanged; however, a more uniform welding of the cap 4 and of the winding end 3a is obtained by supplying heat in the axial direction relative to the pin 2. In this case too, the cap 4 could be pinched on the terminal pin 2, before welding, by means of pincer jaws 5.

Figure 4:
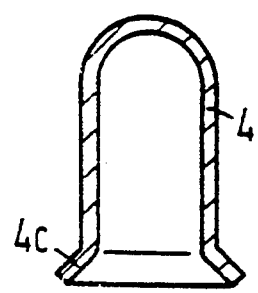
FIG. 4 is an enlarged cross section of a metal cap as used in the welding process according to the invention, the cap having been formed as a deep-drawn part.

FIG. 4 shows diagrammatically, in section, an individual cap 4 which is deep-drawn from sheet-metal material. The open edge 4c is expediently drawn conically outwards, in order to make it easier to slip the cap 4 onto the terminal pin 2.

Figure 5A:
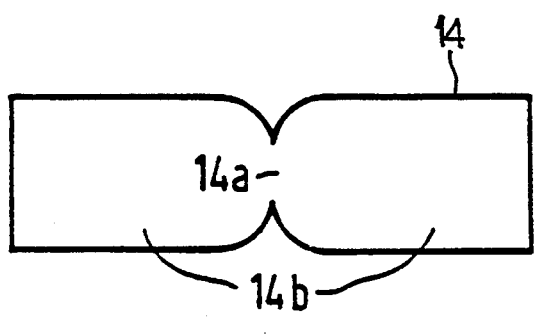
FIGS. 5a and 5b are a plan view of a sheet-metal blank and, respectively, a side view of a metal cap formed from the blank.
Figure 5B:
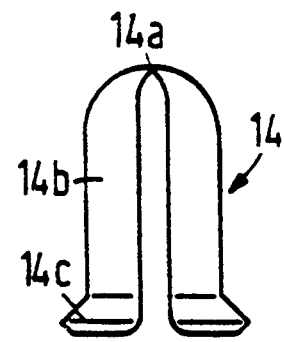

FIGS. 5a and 5b show, in two representations and the production of a cap 14 from a sheet-metal blank which has been formed with a middle part 14a indented from both sides and two side parts 14b. By bending the blank in a mold, the middle part 14a is shaped into the partially closed end of the cap 14, while the side parts 14b are shaped into a more or less closed casing. In this case too, the edge 14c at the open end is bent conically outwards.

Figure 6A:
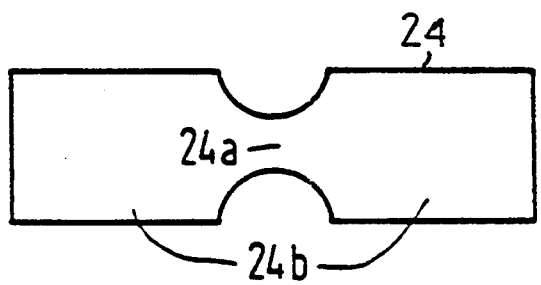
Figure 6B:
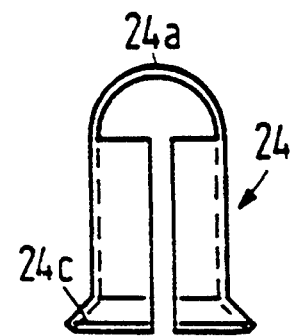

FIGS. 6a and 6b likewise show two views of a somewhat modified form of a cap 24 which is bent from a sheet-metal blank shown in (FIG. 6a). In this case, the middle part 24a of the blank is constricted between the two side parts 24b by semicircular recesses. After shaping the blank in a mold, the cap according to FIG. 6b, having a partially closed end and the casing formed from the side parts 24b, is obtained. The edge 24c at the open end is once again shaped conically outwards.

Although other modifications and changes may be suggested by those skilled in the art, it is the intention of the inventor to embody within the patent warranted hereon all changes and modifications as reasonably and properly come within the scope of his contribution to the art.

We claim:

1. A welding process for connecting a winding wire of a coil to a terminal, comprising the steps of:
    attaching the winding wire to the terminal;
    slipping a metal sleeve over the terminal and the winding wire attached to the terminal, the metal sleeve being of a cap form having an at least partially closed end, said metal sleeve being slipped onto the terminal until the metal sleeve is seated, as a result of its dimensions, with the at least partially closed end on a free end of the terminal and, with an end edge at an open end of the metal sleeve spaced from a coil form in which the terminal is anchored;
    welding the metal sleeve on the terminal and the winding wire in inert gas from the at least partially closed end.

2. A process as claimed in claim 1, further comprising the step of:
    before the welding step, pinching the metal sleeve at side regions against the terminal.

3. A process as claimed in claim 1 wherein said step of welding uses an arc-welding process and comprising the steps of:
    contacting the metal sleeve placed onto the terminal with a radially applied contact bar,
    blowing the inert gas onto the metal sleeve approximately in an axial direction of the terminal via a nozzle, and
    contacting the metal sleeve with the nozzle which serves as a counter electrode for welding.

4. A process as claimed in claim 1, wherein said welding step uses a laser-welding process, including:
    directing a laser beam onto the closed end region of the metal sleeve, and
    blowing inert gas simultaneously onto the end portion of the metal sleeve.

5. A process as claimed in claim 1, wherein said step of welding uses a plasma-welding process.

6. A process as claimed in claim 1, further comprising the step of:
    cupping the metal sleeve to form a cap that is closed on one side prior to said slipping step.

7. A process as claimed in claim 1, further comprising the step of:
    forming the metal sleeve from a sheet-metal blank having a middle part of reduced width and two elongated side parts, the middle part forming the at least partially closed end and the two elongated side parts being bent to form a casing of the metal sleeve.

8. A process as claimed in claim 1, further comprising the step of:
    shaping the metal sleeve with a as claimed in claims 6 or 7, characterized in that the casing of the metal sleeve conically outwards shape at its open end before said slipping step.

9. A process as claimed in claim 1, wherein the metal sleeve is of steel alloy.

10. A process as claimed in claim 1, wherein the metal sleeve is of a copper-plated steel strip.

11. A process as claimed in claim 1, wherein the metal sleeve is of an alloy based on copper with a silver-phosphorous alloy plating.

* * * * *